US011164245B1

(12) United States Patent
Resheff et al.

(10) Patent No.: US 11,164,245 B1
(45) Date of Patent: Nov. 2, 2021

(54) METHOD AND SYSTEM FOR IDENTIFYING CHARACTERISTICS OF TRANSACTION STRINGS WITH AN ATTENTION BASED RECURRENT NEURAL NETWORK

(71) Applicant: Intuit Inc., Mountain View, CA (US)

(72) Inventors: Yehezkel S. Resheff, Tel-Aviv (IL); Shimon Shahar, Rishon-Letziyon (IL); Yair Horesh, Kfar-Saba (IL); Noa Haas, Tel-Aviv (IL)

(73) Assignee: Intuit Inc., Mountain View, CA (US)

( * ) Notice: Subject to any disclaimer, the term of this patent is extended or adjusted under 35 U.S.C. 154(b) by 121 days.

(21) Appl. No.: 16/115,186

(22) Filed: Aug. 28, 2018

(51) Int. Cl.
| | |
|---|---|
| *G06Q 40/02* | (2012.01) |
| *G06Q 20/42* | (2012.01) |
| *G06Q 20/38* | (2012.01) |
| *G06N 3/08* | (2006.01) |
| *G06Q 20/40* | (2012.01) |
| *G06N 3/04* | (2006.01) |

(52) U.S. Cl.
CPC .......... *G06Q 40/02* (2013.01); *G06N 3/0427* (2013.01); *G06N 3/08* (2013.01); *G06Q 20/3821* (2013.01); *G06Q 20/3823* (2013.01); *G06Q 20/4014* (2013.01); *G06Q 20/42* (2013.01)

(58) Field of Classification Search
CPC ........ G06N 3/0427; G06N 3/08; G06Q 40/02; G06Q 20/3821; G06Q 20/3823; G06Q 20/4014; G06Q 20/42
See application file for complete search history.

(56) References Cited

U.S. PATENT DOCUMENTS

| | | | | |
|---|---|---|---|---|
| 6,792,422 | B1 * | 9/2004 | Stride | G06Q 40/00 |
| | | | | 705/35 |
| 8,473,377 | B2 * | 6/2013 | Smith | G06Q 40/12 |
| | | | | 705/30 |
| 8,666,976 | B2 * | 3/2014 | Merz | G06F 16/90344 |
| | | | | 707/727 |
| 9,053,431 | B1 * | 6/2015 | Commons | G06N 3/08 |
| 9,063,978 | B1 * | 6/2015 | Kapoor | G06F 16/24564 |
| 9,754,218 | B1 * | 9/2017 | Brestoff | G06N 3/0445 |
| 10,504,126 | B2 * | 12/2019 | Kulkarni | H04M 15/58 |
| 2002/0173986 | A1 * | 11/2002 | Lehew | G06Q 40/02 |
| | | | | 705/1.1 |
| 2004/0249839 | A1 * | 12/2004 | Beenau | G06Q 20/00 |
| 2009/0037461 | A1 * | 2/2009 | Rukonic | G06Q 40/02 |

(Continued)

OTHER PUBLICATIONS

K. Ziegler et al., "Injecting Semantic Background Knowledge into Neural Networks using Graph Embeddings," 2017 IEEE 26th International Conference on Enabling Technologies: Infrastructure for Collaborative Enterprises (WETICE), 2017, pp. 200-205, doi: 10.1109/WETICE.2017.36. (Year: 2017).*

*Primary Examiner* — Bruce I Ebersman
*Assistant Examiner* — Steven R Chism
(74) *Attorney, Agent, or Firm* — Paradice and Li LLP

(57) ABSTRACT

A method and system identify characteristics of financial transaction description strings. The method and system trains an analysis model with a machine learning process to classify financial transaction description strings. The analysis model generates a table that indicates the portions of the financial transaction description strings that were relevant in classifying the financial transaction description strings and the portions that were not relevant.

8 Claims, 5 Drawing Sheets

(56) References Cited

U.S. PATENT DOCUMENTS

| | | | |
|---|---|---|---|
| 2009/0210368 A1* | 8/2009 | Deo | G06K 9/6267 |
| | | | 706/20 |
| 2012/0317027 A1* | 12/2012 | Luk | G06Q 40/02 |
| | | | 705/44 |
| 2014/0122268 A1* | 5/2014 | Argue | G06Q 20/4014 |
| | | | 705/18 |
| 2014/0214635 A1* | 7/2014 | Just | G06Q 40/12 |
| | | | 705/30 |
| 2014/0279299 A1* | 9/2014 | Erenrich | G06Q 30/02 |
| | | | 705/30 |
| 2017/0140382 A1* | 5/2017 | Chari | G06Q 20/389 |
| 2017/0161643 A1* | 6/2017 | Hoover | G06F 16/25 |
| 2017/0300184 A1* | 10/2017 | Calles | G06Q 40/12 |
| 2018/0204111 A1* | 7/2018 | Zadeh | G06K 9/3233 |
| 2018/0365322 A1* | 12/2018 | Hou | G06K 9/00442 |
| 2019/0295114 A1* | 9/2019 | Pavletic | G06N 3/08 |

\* cited by examiner

200

142

| | STRING | RELEVANT PORTION 1 | IRRELEVANT PORTION 1 | RELEVANT PORTION 2 | IRRELEVANT PORTION 2 |
|---|---|---|---|---|---|
| STRING 1 | WMR1NHRETL937G8 | WMR | 1NH | RETL | 937G8 |
| STRING 2 | STBK0Y9RETA893 | STBK | 0Y9 | RET | A893 |
| STRING 3 | CSTC7DK3KRKLDEC03 | CSTC | DK3 | KRKL | DEC03 |
| STRING 4 | STBK8TT8RETA433 | STBK | 8TT8 | RET | A433 |
| STRING N | WMR90SRETL955G8 | WMR | 90S | RETL | 955G8 |

METHOD AND SYSTEM FOR IDENTIFYING CHARACTERISTICS OF TRANSACTION STRINGS WITH AN ATTENTION BASED RECURRENT NEURAL NETWORK

BACKGROUND

Every year millions of people around the world use electronic data management systems to help manage their personal data. For example, many people utilize financial management systems to help manage their finances. Such financial management systems gather data related to financial transactions of their users. The users can monitor many or all of their financial transactions and other financial matters from a single financial management system. Financial management systems can help users save time by eliminating the need to check several different financial accounts in order to manage their finances. However, many users can still encounter difficulties when using traditional financial management systems.

For instance, financial transaction data typically includes, for each financial transaction, a financial transaction description string. Ideally, the financial transaction description string would clearly identify all characteristics of a financial transaction including the merchant, the price, the date, and the location. However, all too often the financial transaction description strings are so unstructured, lacking in detail, or otherwise corrupted that the characteristics of the financial transactions cannot be reliably identified from the financial transaction description strings alone. In these cases, traditional data management systems will fail to identify all the relevant data associated with these financial transactions.

These failures of traditional data management systems can have tremendous adverse impact on users. A user that views the financial transaction history provided by the data management system may not recognize aspects of the financial transactions because the financial management system only presents the financial transaction description strings to the user due to the fact that the data management system is unable to identify relevant characteristics of the financial transactions from the financial transaction description strings. This may cause the user to undergo great efforts to identify further details related to the financial transactions. In some cases, the user may decide that a financial transaction is fraudulent and may initiate fraud prevention procedures with a credit card company or bank only to finally discover that the financial transaction was valid. Users may become very frustrated with the traditional financial management system and may eventually abandon the financial management system in favor of other methods of managing their finances. Not only does this adversely affect the users, but financial management systems may need to devote large amounts of human and computer resources to assist large numbers of users in resolving these issues.

What is needed is a method and system that solves the long-standing technical problem of electronic data management systems that are unable to identify all relevant details associated with a financial transaction based on the financial transaction description string.

SUMMARY

Embodiments of the present disclosure provide one or more technical solutions to the technical problem of electronic data management systems that are unable to identify all relevant details associated with a financial transaction based on the financial transaction description string. Embodiments of the present disclosure include a data management system that receives financial transaction data related to financial transactions of the users. The financial transactions each include a financial transaction description string. Embodiments of the present disclosure generate training set data that includes financial transaction description strings that have been classified and labeled according to a particular type of classification. Embodiments of the present disclosure utilize the training set data to train an analysis model with a machine learning process to accurately classify the financial transaction description strings according to the particular classification.

Embodiments of the present disclosure utilize the analysis model to identify the portions of the financial transaction description strings that were relevant to classifying the financial transaction description strings. Embodiments of the present disclosure identify the portions of the financial transaction strings that were not relevant to accurately classifying the financial transaction description strings. Embodiments of the present disclosure generate a table that identifies the relevant and irrelevant portions of the financial transaction description strings. Analysis of the table can identify how the irrelevant portions of the financial transaction description strings can be utilized to identify other details associated with the financial transactions.

Embodiments of the present disclosure address some of the shortcomings associated with traditional data management systems. Machine learning processes are utilized to assist in identifying how various portions of financial transaction description strings can be utilized to learn other details about the financial transaction description strings. The various embodiments of the disclosure can be implemented to improve the technical fields of data management, data processing, and data transmission. Therefore, the various described embodiments of the disclosure and their associated benefits amount to significantly more than an abstract idea.

Figure 1:
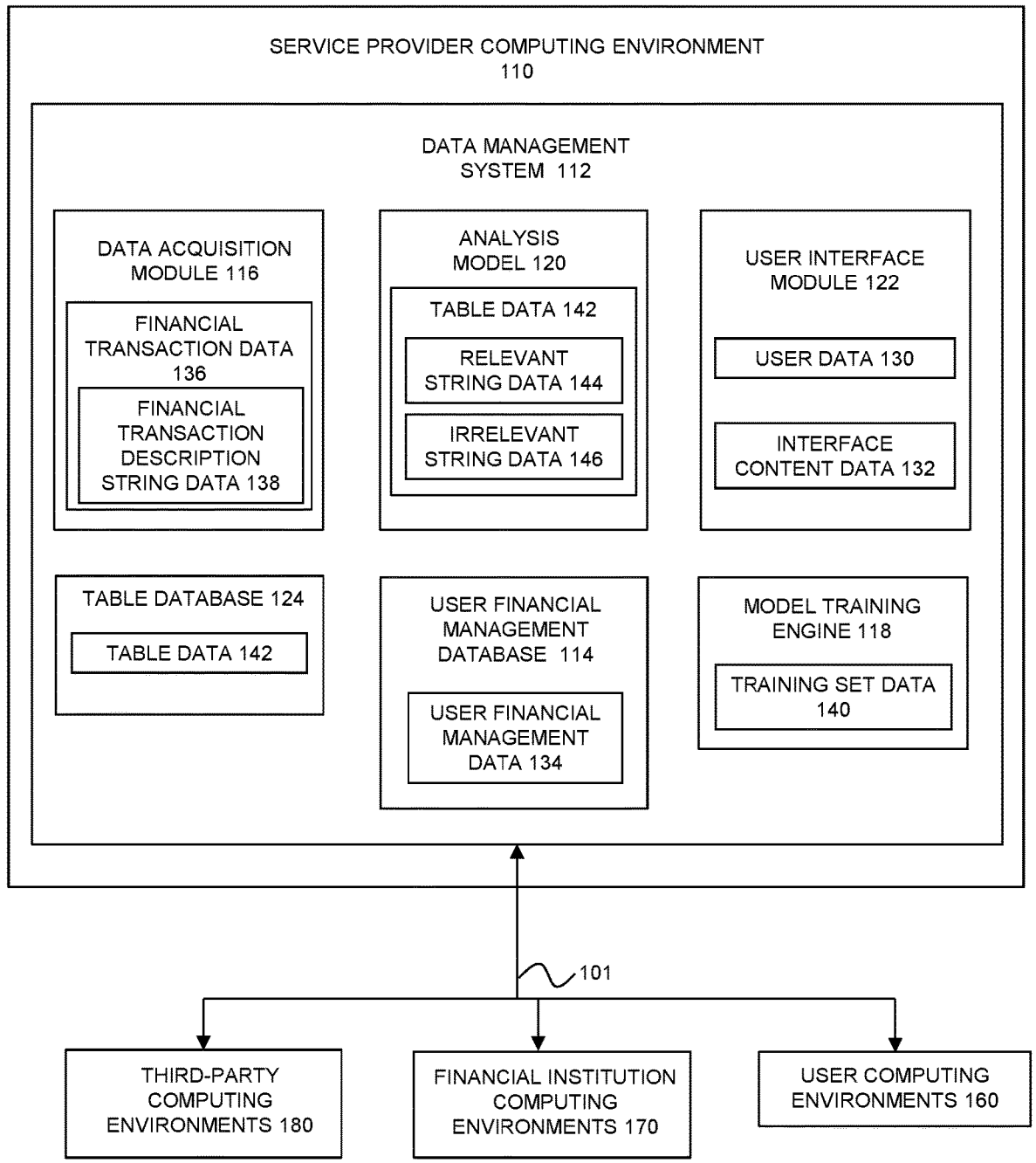
FIG. 1 is a block diagram of a system for identifying characteristics of financial transaction description strings, in accordance with one embodiment.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments.

Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

FIG. 1 illustrates a block diagram of a production environment 100 for identifying characteristics of financial transaction description strings, according to one embodiment. Embodiments of the present disclosure utilize machine learning processes to learn how known characteristics of financial transaction description strings can be utilized to learn how poorly understood characteristics of financial transaction description strings can be utilized to learn further details about the financial transactions. By training an analysis model to classify financial transactions based on known characteristics of financial transaction description strings, the analysis model can identify which portions of financial transaction description strings are not pertinent to the classification. The analysis model can generate a table indicating which portions of the financial transaction description strings are relevant to the classification and which portions of the financial transaction description strings are not relevant to the classification. This table facilitates easy access to and study of the less well understood portions of financial transaction description strings.

In addition, the disclosed methods and systems for identifying characteristics of financial transaction description strings provides for significant improvements to the technical fields of electronic financial transaction data processing, data processing, data management, and user experience.

In addition, as discussed above, the disclosed methods and systems for identifying characteristics of financial transaction description strings provide for the processing and storage of smaller amounts of data, i.e., more efficiently provide financial management services; thereby eliminating unnecessary data analysis and storage. Consequently, using the disclosed methods and systems for identifying characteristics of financial transaction description strings results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system providing methods and systems for identifying characteristics of financial transaction description strings.

In one embodiment, financial transaction description strings include large strings of alphanumeric characters. Some portions of the alphanumeric strings may include recognizable words, portions of words, or portions of dates or prices. However, these words and portions of words are broken up by strings of seemingly unintelligible alphanumeric characters. The unintelligible nature of the transaction description strings as a result, in part, of the disparate systems, servers, and relays through which the description strings pass before they are received by the data management system.

In one embodiment, the financial transaction description strings in the training set data are classified according to the merchant involved in financial transactions. Accordingly, the training set data includes financial transaction description strings for which the merchant counterparty is known. Thus, the financial transaction description strings in the training set data are labeled according to merchant counterparties involved in the financial transactions.

In one embodiment, the data management system trains the analysis model to accurately classify each financial transaction description string from the training set data. During the machine learning process, the analysis model applies various functions to the various portions of the financial transaction description strings in order to identify, from the financial transaction description strings, the merchants involved in the financial transactions.

In one embodiment, a byproduct of this machine learning process is that the portions of the financial transaction description strings that are most relevant in identifying the merchants can be identified by analyzing the learned functions. A further byproduct of this process is that the portions of the financial transaction strings that were not pertinent in identifying the merchants can also be identified.

In one embodiment, the analysis model generates a table identifying, the relevant and irrelevant portions of the financial transaction description strings for identifying the merchants involved. The portions that are not relevant in identifying the merchants involved, may be relevant in identifying other details of the financial transactions, such as a store or branch number of the merchant, a price, a date, a geographic location, or other aspects associated with the financial transaction. The table generated from the analysis model enables analysts to more easily study these less well understood portions of the financial transaction description strings.

In one embodiment, the training set data can be labeled according to other characteristics of the financial transaction description strings aside from the merchant counterparty. Thus, one principle of the present disclosure is to identify which portions of financial transaction description strings are relevant for classifying an aspect of the financial transaction description strings. From this, other details regarding the financial transaction description strings can be learned or deduced.

The production environment 100 includes a service provider computing environment 110, user computing environments 160, financial institution computing environments 170, and third-party computing environments 180, for identifying characteristics of financial transaction description strings, according to various embodiments. The computing environments 110, 160, 170, and 180 are communicatively coupled to each other with one or more communication channels 101, according to one embodiment.

The service provider computing environment 110 represents one or more computing systems such as a server or distribution center that is configured to receive, execute, and host one or more data management systems (e.g., applications) for access by one or more users, for identifying characteristics of financial transaction description strings, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a data management system 112, which is configured to provide data management services to a user.

According to one embodiment, the data management system 112 can be a system that manages one or more of book-keeping, financial accounting, banking, investments, loans, credit cards, real estate investments, retirement planning, bill pay, and budgeting. The data management system 112 can be a tax return preparation system or other type of data management system. The data management system 112 can be a standalone system that provides financial management services to users. Alternatively, the data management system 112 can be integrated into other software or service products provided by a service provider.

The data management system 112 receives financial transaction data related to financial transactions of users of the data management system 112. The data management system provides financial management services to the users based in part on the financial transaction data. For example, the data management system 112 can assist users in tracking expenditures and revenues by gathering the financial transaction data and organizing, for each user, the financial transaction data in a way that assists users to have an accurate view of their financial situations. The financial transaction data includes financial transaction description strings for each financial transaction. The data management system 112 identifies various details regarding financial transactions from the financial transaction description strings.

However, in some cases the financial transaction description strings are not sufficient, by themselves, to identify with certainty various details regarding the financial transactions. Accordingly, the data management system 112 utilizes machine learning processes to better identify and understand the various portions of the financial transaction description strings.

The data management system 112 includes a user interface module 122, a user financial management database 114, a data acquisition module 116, a model training engine 118, an analysis model 120, and a table database 124, according to various embodiments.

The user computing environments 160 correspond to computing environments of the various users of the data management system 112. The users of the data management system 112 utilize the user computing environments 160 to interact with the data management system 112. The users of the data management system 112 can use the user computing environments 160 to provide data to the data management system 112 and to receive data, including financial management services, from the data management system 112.

In one embodiment, the data management system 112 can provide financial management services to individuals, businesses, organizations, government entities, groups of individuals, or any other entities for which financial management services would be beneficial, according to one embodiment. Individuals may utilize the data management system 112 to track their own revenues and expenditures. Businesses of all kinds, including large corporations, mid-size companies, small businesses, or even sole proprietor businesses, can utilize the data management system 112 to track and sort their financial transactions as a way to better manage their finances. Likewise, government organizations may use the data management system 112 to track various types of expenditures and revenues. Organizations other than businesses and government entities, such as nonprofit organizations, may also utilize the data management system 112 for the purpose of monitoring and sorting expenditures and revenues. Thus, the term "user" can refer to many types of entities.

Returning to the data management system 112, the user interface module 122 is configured to receive user data 130 from the users, according to one embodiment. The user data 130 includes information, such as, but not limited to, a name of the user, an address of the user, authentication data that enables the user to access the data management system, or any other types of data that a user may provide in working with the data management system 112.

In one embodiment, the user data 130 can include account data corresponding to financial institution authentication data that enables the data management system 112 to access the financial accounts that the user has with third-party financial institutions or other third-parties. In one embodiment, the financial institution authentication data provided by the users as part of the user data 130 enables the data management system 112 to acquire information related to financial transactions of the users. The financial institution authentication data can include data that allows the data management system 112 to gain access to credit card data, bank account data, retirement fund data, payroll data, income data, loan data, interest accrual data, student loan data, property ownership data, tax data, budgeting data, rent data, investments data, employment data, or other types of data regarding financial transactions or financial accounts of the users. Thus, the financial institution authentication data can include login credentials and personal identification data for various websites of third-party financial institutions. The financial institution authentication data can include usernames, passwords, bank account numbers, routing numbers, credit card numbers, answers to security questions, identification numbers, government identification numbers, birth dates, addresses, or other types of verification credentials that allow the data management system 112 to gain access to online services of third-party financial service institutions.

According to an embodiment, the user interface module 122 provides interface content data 132 to assist the user in managing the user's finances. The interface content data 132 can include navigation menus and other graphical user interface (GUI) tools that enable the user to navigate the data management system 112 in order to receive financial management services. The interface content data 132 can include financial management data related to the financial transactions of the user. Thus, the user interface module 122 enables the data management system 112 to provide financial management services to the user.

In one embodiment, the data management system 112 includes a user financial management database 114. The user financial management database 114 includes the user financial management data 134. The user financial management data 134 can include financial management data for all of the users of the data management system. Thus, the user financial management database 114 can include a vast amount of data related to the financial management services provided to users. In one embodiment, when the user utilizes the user interface module 122 to view interface content data 132, the interface content data 132 includes user financial management data 134 related to the user as retrieved from the user financial management database 114.

In one embodiment, the user financial management data 134 includes data related to the financial transactions of the users. The user financial management data 134 can include, for each user, a list of financial transactions, summaries of various financial accounts, and other tools to assist the user in managing the user's finances.

In one embodiment, each financial transaction in the user financial management data 134 includes merchant identification data that identifies the merchant or vendor involved in the financial transactions. It can be particularly useful for the user to track financial transactions based on which merchants, vendors, or other types of counterparties were party to the financial transactions. This can help the user to more effectively manage the user's finances. Additionally, this can help the user to detect fraud or errors if the user notices, in the financial transactions of the user, unknown merchants with whom the user has not had any financial transactions.

In one embodiment, the data management system 112 utilizes the data acquisition module 116 to retrieve financial transaction data 136 related to the financial transactions of the users of the data management system 112. The data acquisition module 116 is configured to use the financial institution authentication data provided with the user data 130 to acquire financial transaction data 136 related to financial transactions of the users. In particular, the data acquisition module 116 uses the financial institution authentication data received with the user data 130 to log into the online services of third-party financial institutions in order to retrieve financial transaction data 136 related to the financial transactions of users of the data management system 112. For example, the financial transaction data 136 can include debit card transactions, credit card transactions, credit card balances, bank account deposits, bank account withdrawals, credit card payment transactions, online payment service transactions such as PayPal transactions or other online payment service transactions, loan payment transactions, investment account transactions, retirement account transactions, mortgage payment transactions, rent payment transactions, bill pay transactions, budgeting information, financial goal information, or any other types of financial transactions. The data acquisition module 116 is configured to gather the financial transaction data from financial institution computing environments 170 related to financial service institutions with which one or more users of the data management system 112 have a relationship. The financial transaction data 136 can include, for each financial transaction, time stamp data corresponding to a time stamp that indicates the date and time of the financial transaction.

In one example, the data acquisition module 116 uses the financial institution authentication data received with the user data 130 to acquire data related to withdrawals, deposits, and balances in the bank accounts of users. The financial transaction data 136 includes data related to these withdrawals, deposits, and balances. Accordingly, the financial institution authentication data can include usernames, passwords, bank account numbers, routing numbers, or other validation credentials needed to access online services of various banking institutions.

In one embodiment, the financial transaction data 136 includes financial transaction description string data 138. The financial transaction description string data 138 includes financial transaction description strings related to the financial transactions. Typically, when the data acquisition module 116 retrieves financial transaction data 136 related to a particular financial transaction, the financial transaction data will include a financial transaction description string based on the details associated with the financial transaction. These details can include the merchant counterparty, the date of the financial transaction, the price involved in the financial transaction, a geolocation associated with the financial transaction, a branch or store number associated with the financial transaction, a financial institution involved in the financial transaction, and the user involved in the financial transaction.

As set forth above, in many cases the financial transaction description strings are not in a form that enables quickly ascertaining the details of the financial transaction. Some aspects of the financial transaction may be apparent from the financial transaction description strings, such as the merchant involved, but other aspects may not be readily apparent from the financial transaction description strings.

In some cases, the financial transaction description strings include garbled or unintelligible strings of alphanumeric characters. The name of the merchant may be broken up among the strings of alphanumeric characters. A first portion of a name of the merchant may be separated from a second portion of the name of the merchant by several alphanumeric characters. In some cases, the name of the merchant itself is not readily identifiable to a human even when looking for portions of the merchant's name scattered throughout the alphanumeric string.

In one embodiment, the data management system 112 provides further understanding regarding the nature of the financial transaction description strings by applying machine learning processes to training set data generated from the financial transaction data 136. In one embodiment, the data management system utilizes the model training engine 118 and the analysis model 120 to assist in better understanding the various portions of the financial transaction description strings.

In one embodiment, the data management system 112 generates training set data 140. The training set data 140 is generated from the financial transaction data 136. The training set data 140 can be utilized by the model training engine 118 to train an analysis model 120.

In one embodiment, the data management system 112 generates the training set data 140 by gathering a plurality of financial transaction description strings with a known characteristic. Each financial transaction description string is classified and labeled according to the known characteristic.

In one example, in accordance with one embodiment, the training set data 140 is classified according to the merchant counterparty involved in the financial transactions. Accordingly, each financial transaction description string is classified and labeled in accordance with the merchant known to be involved in the financial transaction. Additionally, or alternatively, the financial transaction description strings in the training set data 140 can be labeled are classified in accordance with some other known characteristic or characteristics of the financial transactions including one or more of a date, the price, a geolocation, a store number or branch number, or financial institution involved in the financial transactions.

In one embodiment, the model training engine 118 utilizes the training set data 140 to train the analysis model 120 in accordance with one or more machine learning processes. The model training engine 118 trains the analysis model 120 to accurately classify each of the financial transaction description strings from the training set data 140. The model training engine 118 trains the analysis model 120 to replicate a labeling classification from the training set data 140 based on the financial transaction description strings.

In one embodiment, the model training engine 118 trains the analysis model 120 in iterative processes. The training set data 140 is fed to the analysis model 120. The analysis model 120 applies a set of functions to each financial transaction description string. The analysis model 120 generates a classification for each financial transaction description string based on the set of functions. Thus, the various portions of the alphanumeric string that is the financial transaction description string are the inputs for the set of functions. After the analysis model 120 has classified each financial transaction description string, the model training engine 118 checks the accuracy of the classification against the labels from the training set data 140.

In one embodiment, after the model training engine 118 checks the accuracy of the previous classification, the analysis model 120 adjusts the set of functions. After the set of functions has been adjusted, the analysis model 120 again analyzes the financial transaction description strings from the training set data 140 and classifies each financial transaction description string. After each financial transaction description string has been classified, the model training engine 118 again checks the accuracy of the classifications.

In one embodiment, the machine learning process continues by iteratively adjusting the set of functions and checking the resulting classifications. This process continues until the analysis model 120 has learned a set of functions that results in accurate classification of the financial transactions descriptions from the training set data 140. In this way, the model training engine 118 trains the analysis model 120 with a machine learning process until the analysis model 120 can accurately classify the financial transactions based on the financial transaction description strings.

In one embodiment, the model training engine 118 trains the analysis model 120 with a supervised machine learning process. The machine learning processes supervised because the training set data 140 includes labeled data against which the classification performed by the analysis model 120 can be checked. Alternatively, or additionally, the model training engine 118 can train the analysis model with an unsupervised machine learning process. Alternatively, or additionally, the model training engine 118 can train an analysis model with an unsupervised deep learning machine learning process. Alternatively, or additionally, the model training engine 118 can train the analysis model 120 with a combination of supervised, unsupervised, and deep learning machine learning processes.

In one embodiment, after the analysis model 120 has learned a set of functions that accurately reproduces the classification of the training set data 140, the analysis model 120 can be utilized to assist in learning further details about a financial transaction description string. By analyzing the set of functions utilized by the analysis model 120 to classify the financial transaction description strings, the analysis model 120 can identify which portions of the financial transaction description strings were relevant to the analysis model in classifying the financial transaction description strings in accordance with the selected type of classification. This knowledge can be very useful in gaining further knowledge about the nature of the financial transaction description strings.

In one embodiment, the analysis model 120 identifies the portions of the financial transaction description strings that were not relevant, or that were less relevant, or that were not important to the analysis model 120 in classifying the financial transaction description strings. Thus, a byproduct of knowing which portions of the financial transaction description strings were relevant in classifying the financial transaction description strings, is the knowledge of which portions of the financial transaction description strings were not relevant to the analysis model 120 in classifying the financial transaction description strings.

In one example, in accordance with one embodiment, the training set data 140 is labeled or classified based on the merchants involved in the financial transactions. After the analysis model 120 has been trained, the analysis model 120 can identify which portions of the financial transaction description strings were relevant to the analysis model 120 in determining who were the merchants involved in the financial transactions. In some cases, there may be multiple relevant portions of a financial transaction description string separated by irrelevant portions of the financial transaction description string. The knowledge of which portions of the financial transaction description strings were relevant in identifying the merchants involved in the financial transaction description strings can enhance the ability of the data management system 112 to identify merchants from the financial transaction description strings in the future. The knowledge of which portions of the financial transaction description strings were relevant can also assist in determining what details about the financial transactions can be learned from the other portions of the financial transaction description strings.

In one embodiment, the "irrelevant portions" may not in fact be entirely irrelevant in classifying the financial transaction description strings. "Irrelevant portions" merely describes that these portions did not factor significantly in the functions utilized by the analysis model 120 in classifying the financial transaction description strings. With further understanding, it is possible that the "irrelevant portions" could be relevant in the selected type of classification.

In one embodiment, the analysis model 120 generates table data 142. The table data 142 includes relevant string data 144 and irrelevant string data 146. The relevant string data 144 includes the portions of the financial transaction description strings that were relevant to the analysis model 120 in classifying the financial transaction description strings. The irrelevant string data 146 includes the portions of the financial transaction description strings that were irrelevant to the analysis model 120 in classifying the financial transaction description strings.

In one embodiment, the table data 142 includes rows and columns. Each row can correspond to a particular financial transaction description string. There may be multiple columns identifying portions of the financial transaction description strings that were relevant to the analysis model 120 in classifying the financial transaction description strings. There may be multiple columns identifying portions of the financial transaction description strings that were not relevant to the analysis model in classifying the financial transaction description strings.

In one embodiment, the data management system 112 can analyze the table data 142 to identify how the irrelevant portions of the financial transaction description strings indicates other details associated with the financial transactions. The data management system 112 can analyze the table data 142 in an automated process. Alternatively, human analysts and experts can analyze the table data 142 because it is convenient formatting in order to better understand the meaning of the relevant portions of the financial transaction description strings.

In the example in which the relevant portions correspond to the portions used by the analysis model 120 to identify a merchant involved in the financial transaction description string, the relevant portions can correspond to other aspects of the financial transaction description strings. These other aspects can be better understood after the analysis of the table data 142.

In one embodiment, the analysis model includes a recurrent neural network. The recurrent neural network can include a plurality of nodes. Connections between the nodes form a directed graph along a sequence. The recurrent neural network can exhibit dynamic temporal behavior for a time sequence. The recurrent neural network can use its internal memory to process sequences of inputs. In one embodiment, the recurrent neural network is an attention based recurrent neural network.

In one embodiment, the analysis model 120 is a classifier model. The classifier model receives financial transaction description strings as input and classifies the financial transaction description strings.

In one embodiment, the table database 124 store table data 142 including one or more tables generated by or from the analysis model 120.

Embodiments of the present disclosure address some of the shortcomings associated with traditional data management systems. Machine learning processes are utilized to assist in identifying how various portions of financial transaction description strings can be utilized to learn other details about the financial transaction description strings. The various embodiments of the disclosure can be implemented to improve the technical fields of data management, data processing, and data transmission. Therefore, the various described embodiments of the disclosure and their associated benefits amount to significantly more than an abstract idea.

Figure 2:
FIG. 2 is a diagram of a table for identifying characteristics of financial transaction description strings, in accordance with one embodiment.

FIG. 2 is a diagram of a table 200 for identifying characteristics of financial transaction description strings, according to one embodiment. The table includes table data 142. The table data 142 includes N financial transaction description strings. Each row corresponds to a financial transaction description string. A first column of the table 200 lists the financial transaction description strings. A second column lists the first relevant portion of the financial transaction description strings. A third column list a first irrelevant portion of the financial transaction description strings. A fourth column lists a second relevant portion of the financial transaction description strings. A fifth column lists a second irrelevant portions of the financial transaction description strings.

Those of skill in the art will recognize, in light of the present disclosure, that the table data 142 can include various formats other than the format shown in FIG. 2. Those of skill in the art will recognize, in light of the present disclosure, that the transaction description strings can have different forms than shown in FIG. 2. Those of skill in the art will recognize, in light of the present disclosure, that the irrelevant and relevant portions can have different forms than shown in FIG. 2. Those of skill in the art will recognize, in light of the present disclosure, that there may be fewer or more relevant and irrelevant portions than are shown in the table 200 of FIG. 2.

Figure 3:
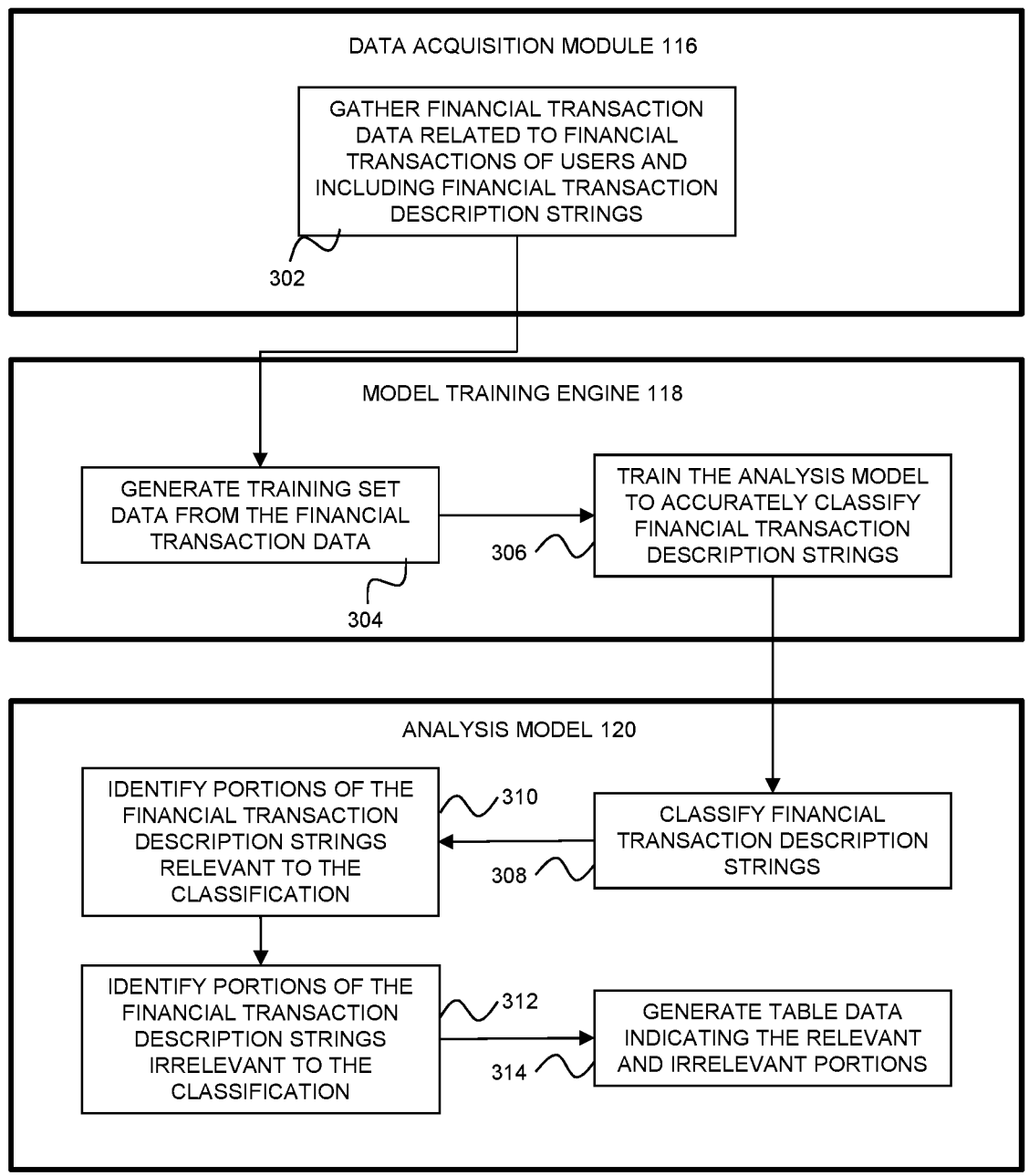
FIG. 3 is a block diagram of a process for identifying characteristics of financial transaction description strings, in accordance with one embodiment.

FIG. 3 illustrates a functional flow diagram of a process 300 for identifying characteristics of financial transaction description strings, in accordance with one embodiment.

Referring to FIGS. 1-3, and the description of FIGS. 1-2 above, at block 302 the data acquisition module 116 gathers financial transaction data related to financial transactions of users and including financial transaction description strings, using any of the methods, processes, and procedures discussed above with respect to FIGS. 1-2, according to one embodiment. From block 302 the process proceeds to block 304.

At block 304 the model training engine 118 generates training set data from the financial transaction data, using any of the methods, processes, and procedures discussed above with respect to FIGS. 1-2, according to one embodiment. From block 304 the process proceeds to block 306.

At block 306 model training engine trains the analysis model to accurately classify financial transaction description strings, using any of the methods, processes, and procedures discussed above with respect to FIGS. 1-2, according to one embodiment. From block 306 the process proceeds to block 308.

At block 308, the analysis model 120 classifies financial transaction description strings, using any of the methods, processes, and procedures discussed above with respect to FIGS. 1-2, according to one embodiment. From block 308 the process proceeds to block 310.

At block 310, the analysis model 120 identifies portions of financial transaction description strings relevant to the classification, using any of the methods, processes, and procedures discussed above with respect to FIGS. 1-2, according to one embodiment. From block 310 the process proceeds to block 312.

At block 312 the analysis model 120 identifies portions of the financial transaction description strings irrelevant to the classification, using any of the methods, processes, and procedures discussed above with respect to FIGS. 1-2, according to one embodiment. From block 312 the process proceeds to block 314.

At block 314, the analysis model 120 generates table data indicating the relevant and the not relevant portions, using any of the methods, processes, and procedures discussed above with respect to FIGS. 1-2, according to one embodiment.

Those of skill in the art will recognize, in light of the present disclosure, that the process 300 can include different steps and different orders of steps, other than those represented in FIG. 3. All such other processes fall within the scope of the present disclosure.

Figure 4:
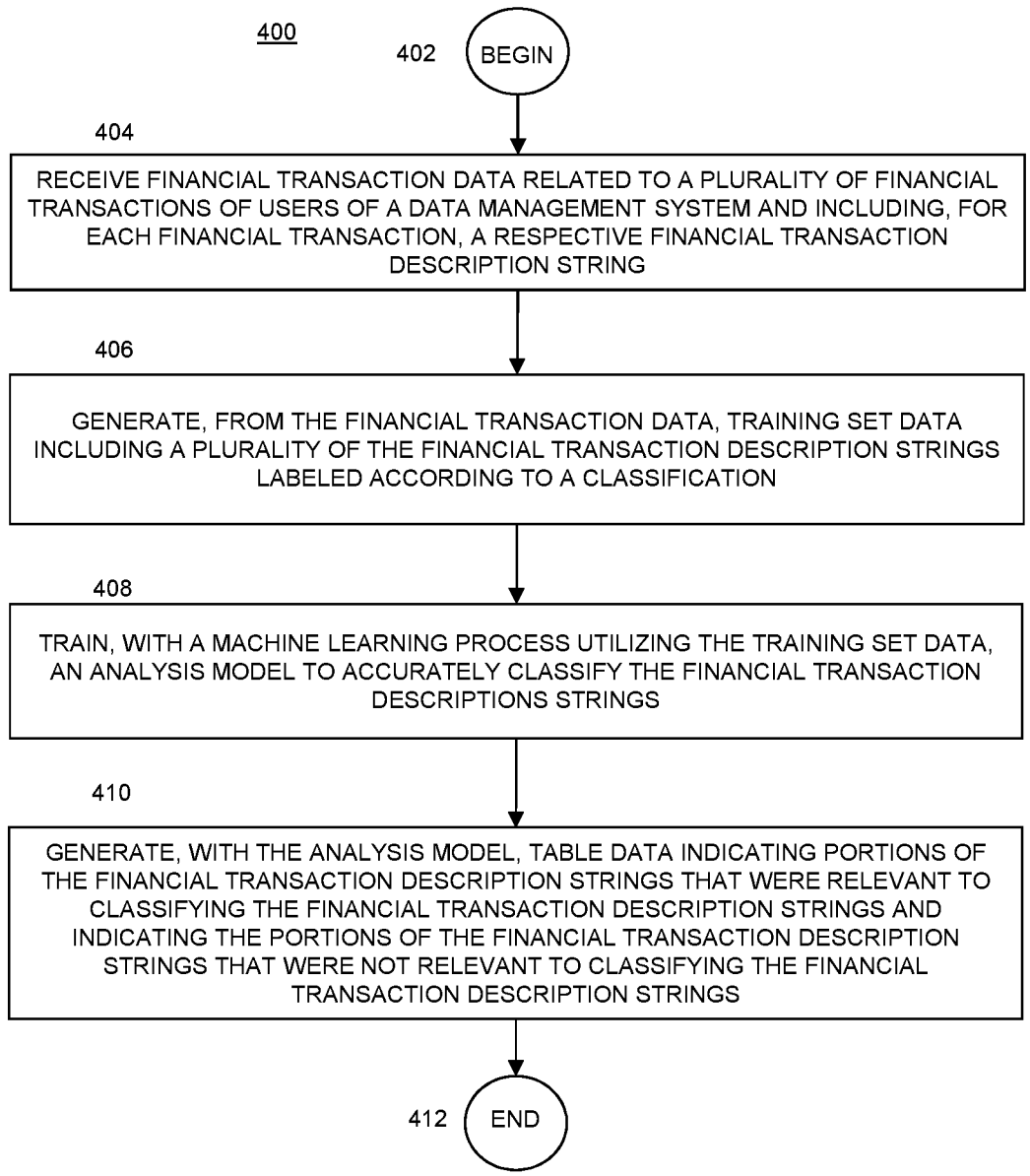
FIG. 4 is a flow diagram of a process for identifying characteristics of financial transaction description strings, in accordance with one embodiment.

FIG. 4 illustrates a flow diagram of a process 400 for identifying characteristics of financial transaction description strings, according to various embodiments.

Referring to FIGS. 1-4, and the description of FIGS. 1-3 above, in one embodiment, process 400 begins at BEGIN 402 and process flow proceeds to RECEIVE FINANCIAL TRANSACTION DATA RELATED TO A PLURALITY OF FINANCIAL TRANSACTIONS OF USERS OF A DATA MANAGEMENT SYSTEM AND INCLUDING, FOR EACH FINANCIAL TRANSACTION, A RESPECTIVE FINANCIAL TRANSACTION DESCRIPTION STRING 404.

In one embodiment, at RECEIVE FINANCIAL TRANSACTION DATA RELATED TO A PLURALITY OF FINANCIAL TRANSACTIONS OF USERS OF A DATA MANAGEMENT SYSTEM AND INCLUDING, FOR EACH FINANCIAL TRANSACTION, A RESPECTIVE FINANCIAL TRANSACTION DESCRIPTION STRING 404, financial transaction data is received related to a plurality of financial transactions of users of a data management system and including, for each financial transaction, a respective financial transaction description string, using any of the methods, processes, and procedures discussed above with respect to FIGS. 1-3.

In one embodiment, once financial transaction data is received related to a plurality of financial transactions of users of a data management system and including, for each financial transaction, a respective financial transaction description string at RECEIVE FINANCIAL TRANSACTION DATA RELATED TO A PLURALITY OF FINANCIAL TRANSACTIONS OF USERS OF A DATA MANAGEMENT SYSTEM AND INCLUDING, FOR EACH FINANCIAL TRANSACTION, A RESPECTIVE FINANCIAL TRANSACTION DESCRIPTION STRING 404 process flow proceeds to GENERATE, FROM THE FINANCIAL TRANSACTION DATA, TRAINING SET DATA INCLUDING A PLURALITY OF THE FINANCIAL TRANSACTION DESCRIPTION STRINGS LABELED ACCORDING TO A CLASSIFICATION 406.

In one embodiment, at GENERATE, FROM THE FINANCIAL TRANSACTION DATA, TRAINING SET DATA INCLUDING A PLURALITY OF THE FINANCIAL TRANSACTION DESCRIPTION STRINGS LABELED ACCORDING TO A CLASSIFICATION 406, training set data is generated, from the financial transaction data, including a plurality of the financial transaction description strings labeled according to a classification, using any of the methods, processes, and procedures discussed above with respect to FIGS. 1-3.

In one embodiment, once training set data is generated, from the financial transaction data, including a plurality of the financial transaction description strings labeled according to a classification at GENERATE, FROM THE FINANCIAL TRANSACTION DATA, TRAINING SET DATA INCLUDING A PLURALITY OF THE FINANCIAL TRANSACTION DESCRIPTION STRINGS LABELED ACCORDING TO A CLASSIFICATION 406, process flow proceeds to TRAIN, WITH A MACHINE LEARNING PROCESS UTILIZING THE TRAINING SET DATA, AN ANALYSIS MODEL TO ACCURATELY CLASSIFY THE FINANCIAL TRANSACTION DESCRIPTIONS STRINGS 408.

In one embodiment, at TRAIN, WITH A MACHINE LEARNING PROCESS UTILIZING THE TRAINING SET DATA, AN ANALYSIS MODEL TO ACCURATELY CLASSIFY THE FINANCIAL TRANSACTION DESCRIPTIONS STRINGS 408, an analysis model is trained, with a machine learning process utilizing the training set data, to accurately classify the financial transaction descriptions strings, using any of the methods, processes, and procedures discussed above with respect to FIGS. 1-3.

In one embodiment, once an analysis model is trained, with a machine learning process utilizing the training set data, to accurately classify the financial transaction descriptions strings at TRAIN, WITH A MACHINE LEARNING PROCESS UTILIZING THE TRAINING SET DATA, AN ANALYSIS MODEL TO ACCURATELY CLASSIFY THE FINANCIAL TRANSACTION DESCRIPTIONS STRINGS 408, process flow proceeds to GENERATE, WITH THE ANALYSIS MODEL, TABLE DATA INDICATING PORTIONS OF THE FINANCIAL TRANSACTION DESCRIPTION STRINGS THAT WERE RELEVANT TO CLASSIFYING THE FINANCIAL TRANSACTION DESCRIPTION STRINGS AND INDICATING THE PORTIONS OF THE FINANCIAL TRANSACTION DESCRIPTION STRINGS THAT WERE NOT RELEVANT TO CLASSIFYING THE FINANCIAL TRANSACTION DESCRIPTION STRINGS 410.

In one embodiment, at GENERATE, WITH THE ANALYSIS MODEL, TABLE DATA INDICATING PORTIONS OF THE FINANCIAL TRANSACTION DESCRIPTION STRINGS THAT WERE RELEVANT TO CLASSIFYING THE FINANCIAL TRANSACTION DESCRIPTION STRINGS AND INDICATING THE PORTIONS OF THE FINANCIAL TRANSACTION DESCRIPTION STRINGS THAT WERE NOT RELEVANT TO CLASSIFYING THE FINANCIAL TRANSACTION DESCRIPTION STRINGS 410, table data is generated, with the analysis model, indicating portions of the financial transaction description strings that were relevant to classifying the financial transaction description strings and indicating the portions of the financial transaction description strings that were not relevant to classifying the financial transaction description strings, using any of the methods, processes, and procedures discussed above with respect to FIGS. 1-3.

In one embodiment, once table data is generated, with the analysis model, indicating portions of the financial transaction description strings that were relevant to classifying the financial transaction description strings and indicating the portions of the financial transaction description strings that were not relevant to classifying the financial transaction description strings at GENERATE, WITH THE ANALYSIS MODEL, TABLE DATA INDICATING PORTIONS OF THE FINANCIAL TRANSACTION DESCRIPTION STRINGS THAT WERE RELEVANT TO CLASSIFYING THE FINANCIAL TRANSACTION DESCRIPTION STRINGS AND INDICATING THE PORTIONS OF THE FINANCIAL TRANSACTION DESCRIPTION STRINGS THAT WERE NOT RELEVANT TO CLASSIFYING THE FINANCIAL TRANSACTION DESCRIPTION STRINGS 410, process flow proceeds to END 412.

In one embodiment, at END 412 the process for identifying characteristics of financial transaction description strings is exited to await new data and/or instructions.

Figure 5:
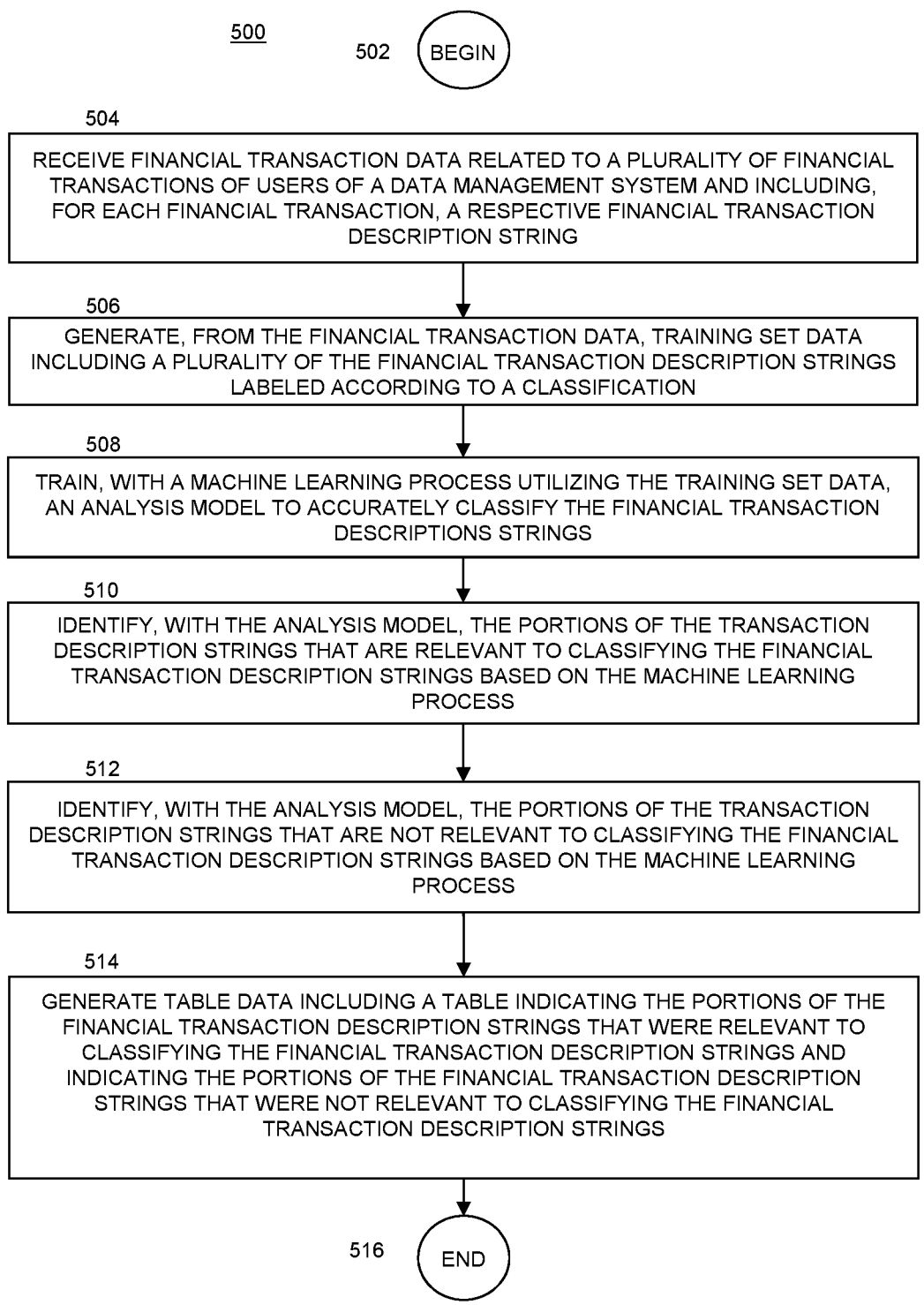
FIG. 5 is a flow diagram of a process for identifying characteristics of financial transaction description strings, in accordance with one embodiment.

FIG. 5 illustrates a flow diagram of a process 500 for identifying characteristics of financial transaction description strings, according to various embodiments.

Referring to FIG. 5, FIGS. 1-3, and the description of FIGS. 1-3 above, in one embodiment, process 500 begins at BEGIN 502 and process flow proceeds to RECEIVE FINANCIAL TRANSACTION DATA RELATED TO A PLURALITY OF FINANCIAL TRANSACTIONS OF USERS OF A DATA MANAGEMENT SYSTEM AND INCLUDING, FOR EACH FINANCIAL TRANSACTION, A RESPECTIVE FINANCIAL TRANSACTION DESCRIPTION STRING 504.

In one embodiment, at RECEIVE FINANCIAL TRANSACTION DATA RELATED TO A PLURALITY OF FINANCIAL TRANSACTIONS OF USERS OF A DATA MANAGEMENT SYSTEM AND INCLUDING, FOR EACH FINANCIAL TRANSACTION, A RESPECTIVE FINANCIAL TRANSACTION DESCRIPTION STRING 504, financial transaction data is received related to a plurality of financial transactions of users of a data management system and including, for each financial transaction, a respective financial transaction description string, using any of the methods, processes, and procedures discussed above with respect to FIGS. 1-3.

In one embodiment, once financial transaction data is received related to a plurality of financial transactions of users of a data management system and including, for each financial transaction, a respective financial transaction description string at RECEIVE FINANCIAL TRANSACTION DATA RELATED TO A PLURALITY OF FINANCIAL TRANSACTIONS OF USERS OF A DATA MANAGEMENT SYSTEM AND INCLUDING, FOR EACH FINANCIAL TRANSACTION, A RESPECTIVE FINANCIAL TRANSACTION DESCRIPTION STRING 504 process flow proceeds to GENERATE, FROM THE FINANCIAL TRANSACTION DATA, TRAINING SET DATA INCLUDING A PLURALITY OF THE FINANCIAL TRANSACTION DESCRIPTION STRINGS LABELED ACCORDING TO A CLASSIFICATION 506.

In one embodiment, at GENERATE, FROM THE FINANCIAL TRANSACTION DATA, TRAINING SET DATA INCLUDING A PLURALITY OF THE FINANCIAL TRANSACTION DESCRIPTION STRINGS LABELED ACCORDING TO A CLASSIFICATION 506, training set data is generated, from the financial transaction data, including a plurality of the financial transaction description strings labeled according to a classification, using any of the methods, processes, and procedures discussed above with respect to FIGS. 1-3.

In one embodiment, once training set data is generated, from the financial transaction data, including a plurality of the financial transaction description strings labeled according to a classification at GENERATE, FROM THE FINANCIAL TRANSACTION DATA, TRAINING SET DATA INCLUDING A PLURALITY OF THE FINANCIAL TRANSACTION DESCRIPTION STRINGS LABELED ACCORDING TO A CLASSIFICATION 506, process flow proceeds to TRAIN, WITH A MACHINE LEARNING PROCESS UTILIZING THE TRAINING SET DATA, AN ANALYSIS MODEL TO ACCURATELY CLASSIFY THE FINANCIAL TRANSACTION DESCRIPTIONS STRINGS 508.

In one embodiment, at TRAIN, WITH A MACHINE LEARNING PROCESS UTILIZING THE TRAINING SET DATA, AN ANALYSIS MODEL TO ACCURATELY CLASSIFY THE FINANCIAL TRANSACTION DESCRIPTIONS STRINGS 508, an analysis model is trained, with a machine learning process utilizing the training set data, to accurately classify the financial transaction descriptions strings, using any of the methods, processes, and procedures discussed above with respect to FIGS. 1-3.

In one embodiment, once an analysis model is trained, with a machine learning process utilizing the training set data, to accurately classify the financial transaction descriptions strings at TRAIN, WITH A MACHINE LEARNING PROCESS UTILIZING THE TRAINING SET DATA, AN ANALYSIS MODEL TO ACCURATELY CLASSIFY THE FINANCIAL TRANSACTION DESCRIPTIONS STRINGS 508, process flow proceeds to IDENTIFY, WITH THE ANALYSIS MODEL, THE PORTIONS OF THE TRANSACTION DESCRIPTION STRINGS THAT ARE RELEVANT TO CLASSIFYING THE FINANCIAL TRANSACTION DESCRIPTION STRINGS BASED ON THE MACHINE LEARNING PROCESS 510.

In one embodiment, at IDENTIFY, WITH THE ANALYSIS MODEL, THE PORTIONS OF THE TRANSACTION DESCRIPTION STRINGS THAT ARE RELEVANT TO CLASSIFYING THE FINANCIAL TRANSACTION DESCRIPTION STRINGS BASED ON THE MACHINE LEARNING PROCESS 510, portions of the transaction description strings are identified with the analysis model, that are relevant to classifying the financial transaction description strings based on the machine learning process, using any of the methods, processes, and procedures discussed above with respect to FIGS. 1-3.

In one embodiment, once portions of the transaction description strings are identified with the analysis model, that are relevant to classifying the financial transaction description strings based on the machine learning process at IDENTIFY, WITH THE ANALYSIS MODEL, THE PORTIONS OF THE TRANSACTION DESCRIPTION STRINGS THAT ARE RELEVANT TO CLASSIFYING THE FINANCIAL TRANSACTION DESCRIPTION STRINGS BASED ON THE MACHINE LEARNING PROCESS 510, process flow proceeds to IDENTIFY, WITH THE ANALYSIS MODEL, THE PORTIONS OF THE TRANSACTION DESCRIPTION STRINGS THAT ARE NOT RELEVANT TO CLASSIFYING THE FINANCIAL TRANSACTION DESCRIPTION STRINGS BASED ON THE MACHINE LEARNING PROCESS 512.

In one embodiment, at IDENTIFY, WITH THE ANALYSIS MODEL, THE PORTIONS OF THE TRANSACTION DESCRIPTION STRINGS THAT ARE NOT RELEVANT TO CLASSIFYING THE FINANCIAL TRANSACTION DESCRIPTION STRINGS BASED ON THE MACHINE LEARNING PROCESS 512, portions of the transaction description strings are identified that are not relevant to classifying the financial transaction description strings based on the machine learning process, using any of the methods, processes, and procedures discussed above with respect to FIGS. 1-3.

In one embodiment, once portions of the transaction description strings are identified that are not relevant to classifying the financial transaction description strings based on the machine learning process at IDENTIFY, WITH THE ANALYSIS MODEL, THE PORTIONS OF THE TRANSACTION DESCRIPTION STRINGS THAT ARE NOT RELEVANT TO CLASSIFYING THE FINANCIAL TRANSACTION DESCRIPTION STRINGS BASED ON THE MACHINE LEARNING PROCESS 512, process flow proceeds GENERATE TABLE DATA INCLUDING A TABLE INDICATING THE PORTIONS OF THE FINANCIAL TRANSACTION DESCRIPTION STRINGS THAT WERE RELEVANT TO CLASSIFYING THE FINANCIAL TRANSACTION DESCRIPTION STRINGS AND INDICATING THE PORTIONS OF THE FINANCIAL TRANSACTION DESCRIPTION STRINGS THAT WERE NOT RELEVANT TO CLASSIFYING THE FINANCIAL TRANSACTION DESCRIPTION STRINGS 514.

In one embodiment, at GENERATE TABLE DATA INCLUDING A TABLE INDICATING THE PORTIONS OF THE FINANCIAL TRANSACTION DESCRIPTION STRINGS THAT WERE RELEVANT TO CLASSIFYING THE FINANCIAL TRANSACTION DESCRIPTION STRINGS AND INDICATING THE PORTIONS OF THE FINANCIAL TRANSACTION DESCRIPTION STRINGS THAT WERE NOT RELEVANT TO CLASSIFYING THE FINANCIAL TRANSACTION DESCRIPTION STRINGS 514, table data is generated including a table indicating the portions of the financial transaction description strings that were relevant to classifying the financial transaction description strings and indicating the portions of the financial transaction description strings that were not relevant to classifying the financial transaction description strings, using any of the methods, processes, and procedures discussed above with respect to FIGS. 1-3.

In one embodiment, once table data is generated including a table indicating the portions of the financial transaction description strings that were relevant to classifying the financial transaction description strings and indicating the portions of the financial transaction description strings that were not relevant to classifying the financial transaction description strings, at GENERATE TABLE DATA INCLUDING A TABLE INDICATING THE PORTIONS OF THE FINANCIAL TRANSACTION DESCRIPTION STRINGS THAT WERE RELEVANT TO CLASSIFYING THE FINANCIAL TRANSACTION DESCRIPTION STRINGS AND INDICATING THE PORTIONS OF THE FINANCIAL TRANSACTION DESCRIPTION STRINGS THAT WERE NOT RELEVANT TO CLASSIFYING THE FINANCIAL TRANSACTION DESCRIPTION STRINGS 514, process flow proceeds to END 516.

In one embodiment, at END 516 the process for identifying characteristics of financial transaction description strings is exited to await new data and/or instructions.

As noted above, the specific illustrative examples discussed above are but illustrative examples of implementations of embodiments of the method or process for identifying characteristics of financial transaction description strings. Those of skill in the art will readily recognize that other implementations and embodiments are possible. Therefore, the discussion above should not be construed as a limitation on the claims provided below.

In one embodiment, a computing system implemented method identifies characteristics of financial transaction description strings. The method includes receiving financial transaction data related to a plurality of financial transactions of users of a data management system and including, for each financial transaction, a respective financial transaction description string, generating, from the financial transaction data, training set data including a plurality of the financial transaction description strings labeled according to a classification, and training, with a machine learning process utilizing the training set data, an analysis model to accurately classify the financial transaction descriptions strings. The method includes identifying, with the analysis model, the portions of the transaction description strings that are relevant to classifying the financial transaction description strings based on the machine learning process, identifying, with the analysis model, the portions of the transaction description strings that are not relevant to classifying the financial transaction description strings based on the machine learning process, and generating table data indicating the portions of the financial transaction description strings that were relevant to classifying the financial transaction description strings and indicating the portions of the financial transaction description strings that were not relevant to classifying the financial transaction description strings.

In one embodiment, a system for identifying characteristics of financial transaction description strings, the system includes at least one processor at least one memory coupled to the at least one processor. The at least one memory has stored therein instructions which, when executed by any set of the one or more processors, perform a process. The process includes receiving financial transaction data related to a plurality of financial transactions of users of a data management system and including, for each financial transaction, a respective financial transaction description string, generating, from the financial transaction data, training set data including a plurality of the financial transaction description strings labeled according to a classification, and training, with a machine learning process utilizing the training set data, an analysis model to accurately classify the financial transaction descriptions strings. The process includes identifying, with the analysis model, the portions of the transaction description strings that are relevant to classifying the financial transaction description strings based on the machine learning process, identifying, with the analysis model, the portions of the transaction description strings that are not relevant to classifying the financial transaction description strings based on the machine learning process, and generating table data indicating the portions of the financial transaction description strings that were relevant to classifying the financial transaction description strings and indicating the portions of the financial transaction description strings that were not relevant to classifying the financial transaction description strings.

In one embodiment, a computing system implemented method identifies characteristics of financial transaction description strings. The method includes receiving financial transaction data related to a plurality of financial transactions of users of a data management system and including, for each financial transaction, a respective financial transaction description string, generating, from the financial transaction data, training set data including a plurality of the financial transaction description strings labeled according to a classification, and training, with a machine learning process utilizing the training set data, an analysis model to accurately classify the financial transaction descriptions strings. The method includes generating, with the analysis model, table data indicating portions of the financial transaction description strings that were relevant to classifying the financial transaction description strings and indicating the portions of the financial transaction description strings that were not relevant to classifying the financial transaction description strings.

In one embodiment, a system for identifying characteristics of financial transaction description strings, the system includes at least one processor at least one memory coupled to the at least one processor. The at least one memory has stored therein instructions which, when executed by any set of the one or more processors, perform a process. The process includes receiving financial transaction data related to a plurality of financial transactions of users of a data management system and including, for each financial transaction, a respective financial transaction description string, generating, from the financial transaction data, training set data including a plurality of the financial transaction description strings labeled according to a classification, and training, with a machine learning process utilizing the training set data, an analysis model to accurately classify the financial transaction descriptions strings. The process includes generating, with the analysis model, table data indicating portions of the financial transaction description strings that were relevant to classifying the financial transaction description strings and indicating the portions of the financial transaction description strings that were not relevant to classifying the financial transaction description strings.

In one embodiment, a computing system implemented method identifies characteristics of financial transaction description strings. The method includes receiving financial transaction data related to a plurality of financial transactions of users of a data management system and including, for each financial transaction, a respective financial transaction description string, generating, from the financial transaction data, training set data including a plurality of the financial transaction description strings labeled according to a classification, and training, with a machine learning process utilizing the training set data, an analysis model to accurately classify the financial transaction descriptions strings. The method includes receiving new financial transaction data related to a plurality of new financial transactions of users of the data management system and including, for each new financial transaction, a respective financial transaction description string, passing the new financial transaction data through the analysis model, and generating table data indicating portions of the financial transaction description strings of the new financial transaction data that were relevant in classifying the financial transaction description strings and indicating portions of the financial transaction description strings of the new financial transaction data that were not relevant in classifying the financial transaction description strings.

In one embodiment, a system for identifying characteristics of financial transaction description strings, the system includes at least one processor at least one memory coupled to the at least one processor. The at least one memory has stored therein instructions which, when executed by any set of the one or more processors, perform a process. The process includes receiving financial transaction data related to a plurality of financial transactions of users of a data management system and including, for each financial transaction, a respective financial transaction description string, generating, from the financial transaction data, training set data including a plurality of the financial transaction description strings labeled according to a classification, and training, with a machine learning process utilizing the training set data, an analysis model to accurately classify the financial transaction descriptions strings. The process includes receiving new financial transaction data related to a plurality of new financial transactions of users of the data management system and including, for each new financial transaction, a respective financial transaction description string, passing the new financial transaction data through the analysis model, and generating table data indicating portions of the financial transaction description strings of the new financial transaction data that were relevant in classifying the financial transaction description strings and indicating portions of the financial transaction description strings of the new financial transaction data that were not relevant in classifying the financial transaction description strings.

The disclosed embodiments provide one or more technical solutions to the technical problem of understanding financial transaction description strings. These and other embodiments of the data management system are discussed in further detail below.

Utilizing machine learning processes to better understand financial transaction description strings is a technical solution to a long-standing technical problem and is not an abstract idea for at least a few reasons. First, utilizing machine learning processes to better understand financial transaction description strings is not an abstract idea because it is not merely an idea itself (e.g., can be performed mentally or using pen and paper). Second, utilizing machine learning processes to better understand financial transaction description strings is not an abstract idea because it is not a fundamental economic practice (e.g., is not merely creating a contractual relationship, hedging, mitigating a settlement risk, etc.). Third, utilizing machine learning processes to better understand financial transaction description strings is not an abstract idea because it is not a method of organizing human activity (e.g., managing a game of bingo). Fourth, although mathematics may be used to generate an analytics model, the disclosed and claimed methods and systems of utilizing machine learning processes to better understand financial transaction description strings are not an abstract idea because the methods and systems are not simply a mathematical relationship/formula.

Utilizing machine learning processes to better understand financial transaction description strings is not an abstract idea because utilizing machine learning processes to better understand financial transaction description strings yields significant improvement to the technical fields of electronic financial management, data processing, user experience, customer service, and customer retention, according to one embodiment. The present disclosure adds significantly to the field of electronic financial management because the disclosed data management system increases the knowledge of the needs and purposes of users of the data management system, increases the ability of the data management system to provide automated assistance in sorting, grouping and categorizing financial transactions, increases the likelihood of improving/maintaining a user's trust in the data management system; and reduces the amount of time users spend managing their finances, according to one embodiment.

As a result, embodiments of the present disclosure allow for reduced use of processor cycles, memory, and power consumption, by reducing the efforts needed to correct problems encountered by users when they are unable to identify merchants involved in their past financial transactions. Consequently, computing and communication systems implementing or providing the embodiments of the present disclosure are transformed into more operationally efficient devices and systems. In addition to improving overall computing performance, utilizing machine learning processes to better understand financial transaction description strings significantly improves the field of data management systems by reducing the amount of time it takes for a user to sort financial transactions, according to one embodiment. Therefore, both human and non-human resources are utilized more efficiently. Furthermore, by utilizing machine learning processes to better understand financial transaction description strings, loyalty in the data management system is increased. This results in repeat customers, efficient financial management services, and reduced abandonment of use of the data management system, according to one embodiment.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid-state drive, an EEPROM, an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors of a computing device, the method comprising:
    retrieving, by the one or more processors utilizing a data acquisition module of the computing device, from each respective transaction of a first set of transactions, a character string related to the respective transaction;
    generating, by the one or more processors utilizing a training engine of the computing device, first training set data based on the first set of transactions;
    feeding, by the one or more processors utilizing the training engine, the first training set data to an analysis model of the computing device, wherein the analysis model includes a plurality of nodes including connections that form a directed graph along a sequence;
    applying, by the one or more processors utilizing the analysis model, a set of functions to each respective character string retrieved from the first set of transactions, wherein the respective character string is an input for the set of functions;
    classifying, by the one or more processors utilizing the analysis model, each respective character string based on the applying;
    identifying, by the one or more processors utilizing the analysis model, relevant portions of the character strings retrieved from the first set of transactions, wherein each of the relevant portions was relevant in the classifying;
    listing, by the one or more processors utilizing the analysis model, each of the relevant portions in a first column of a relevancy table, wherein each row of the relevancy table corresponds to a respective one of the character strings retrieved from the first set of transactions;
    identifying, by the one or more processors utilizing the analysis model, irrelevant portions of the character strings retrieved from the first set of transactions, wherein each of the irrelevant portions was not relevant in the classifying;
    listing, by the one or more processors utilizing the analysis model, each of the irrelevant portions in a second column of the relevancy table;
    training, by the one or more processors utilizing the relevancy table and a machine learning process incorporated in the training engine, the analysis model to classify character strings based on:
        determining a first level of accuracy of the set of functions against the first training set data based on the classifying;
        adjusting iteratively the set of functions based on the first level of accuracy, wherein the adjusting includes determining, for each iteration, a level of accuracy of classifications that result from the adjusted set of functions; and
        learning iteratively, based on the adjusting iteratively, an adjusted set of functions that can classify character strings at a second level of accuracy higher than the first level of accuracy;
    retrieving, by the one or more processors utilizing the data acquisition module, from each respective transaction of a second set of transactions, a character string related to the respective transaction;
    generating, by the one or more processors utilizing the training engine, second training set data based on the second set of transactions;
    feeding, by the one or more processors utilizing the training engine, the second training set data to the analysis model;
    applying, by the one or more processors utilizing the analysis model, the adjusted set of functions to each respective character string retrieved from the second set of transactions, wherein the respective character string is an input for the adjusted set of functions;
    identifying one or more merchants involved with the second set of transactions based on the relevant portions listed in the first column of the relevancy table;
    identifying a store or a branch number associated with the one or more merchants based on the irrelevant portions listed in the second column of the relevancy table; and
    generating, by the one or more processors utilizing the analysis model, at least one classified character string from the character strings retrieved from the second set of transactions, wherein the at least one classified character string identifies, at least to the second level of accuracy, the one or more merchants and the store or branch number.

2. The method of claim 1, wherein the machine learning process is unsupervised by humans.

3. The method of claim 1, wherein the retrieved character strings include garbled strings of alphanumeric characters.

4. The method of claim 1, wherein the analysis model includes a recurrent neural network including an internal memory for processing sequences of inputs.

5. A system comprising:
    one or more processors; and at least one memory coupled to the one or more processors and storing instructions that, when executed by the one or more processors, cause the one or more processors to perform operations including:
retrieving, from each respective transaction of a first set of transactions, a character string related to the respective transaction;
generating first training set data based on the first set of transactions;
feeding the first training set data to an analysis model, wherein the analysis model includes a plurality of nodes including connections that form a directed graph along a sequence;
applying, utilizing the analysis model, a set of functions to each respective character string retrieved from the first set of transactions, wherein the respective character string is an input for the set of functions;
classifying each respective character string based on the applying;
identifying, utilizing the analysis model, relevant portions of the character strings retrieved from the first set of transactions, wherein each of the relevant portions was relevant in the classifying;
listing, utilizing the analysis model, each of the relevant portions in a first column of a relevancy table, wherein each row of the relevancy table corresponds to a respective one of the character strings retrieved from the first set of transactions;
identifying, utilizing the analysis model, irrelevant portions of the character strings retrieved from the first set of transactions, wherein each of the irrelevant portions was not relevant in the classifying;
listing, utilizing the analysis model, each of the irrelevant portions in a second column of the relevancy table;
training, utilizing the relevancy table and a machine learning process, the analysis model to classify character strings based on:
determining a first level of accuracy of the set of functions against the first training set data based on the classifying;
adjusting iteratively the set of functions based on the first level of accuracy, wherein the adjusting includes determining, for each iteration, a level of accuracy of classifications that result from the adjusted set of functions; and
learning iteratively, based on the adjusting iteratively, an adjusted set of functions that can classify character strings at a second level of accuracy higher than the first level of accuracy;
retrieving, from each respective transaction of a second set of transactions, a character string related to the respective transaction;
generating second training set data based on the second set of transactions;
feeding the second training set data to the analysis model;
applying, utilizing the analysis model, the adjusted set of functions to each respective character string retrieved from the second set of transactions, wherein the respective character string is an input for the adjusted set of functions;
identifying one or more merchants involved with the second set of transactions based on the relevant portions listed in the first column of the relevancy table;
identifying a store or a branch number associated with the one or more merchants based on the irrelevant portions listed in the second column of the relevancy table; and
generating at least one classified character string from the character strings retrieved from the second set of transactions, wherein the at least one classified character string identifies, at least to the second level of accuracy, the one or more merchants and the store or branch number.

6. The system of claim 5, wherein the retrieved character strings include garbled strings of alphanumeric characters.

7. The system of claim 5, wherein the machine learning process is unsupervised by humans.

8. The system of claim 5, wherein the analysis model includes a recurrent neural network including an internal memory for processing sequences of inputs.

* * * * *